Feb. 10, 1931. P. P. CUNNINGHAM 1,791,661
SHOCK ABSORBER
Original Filed Aug. 6, 1928
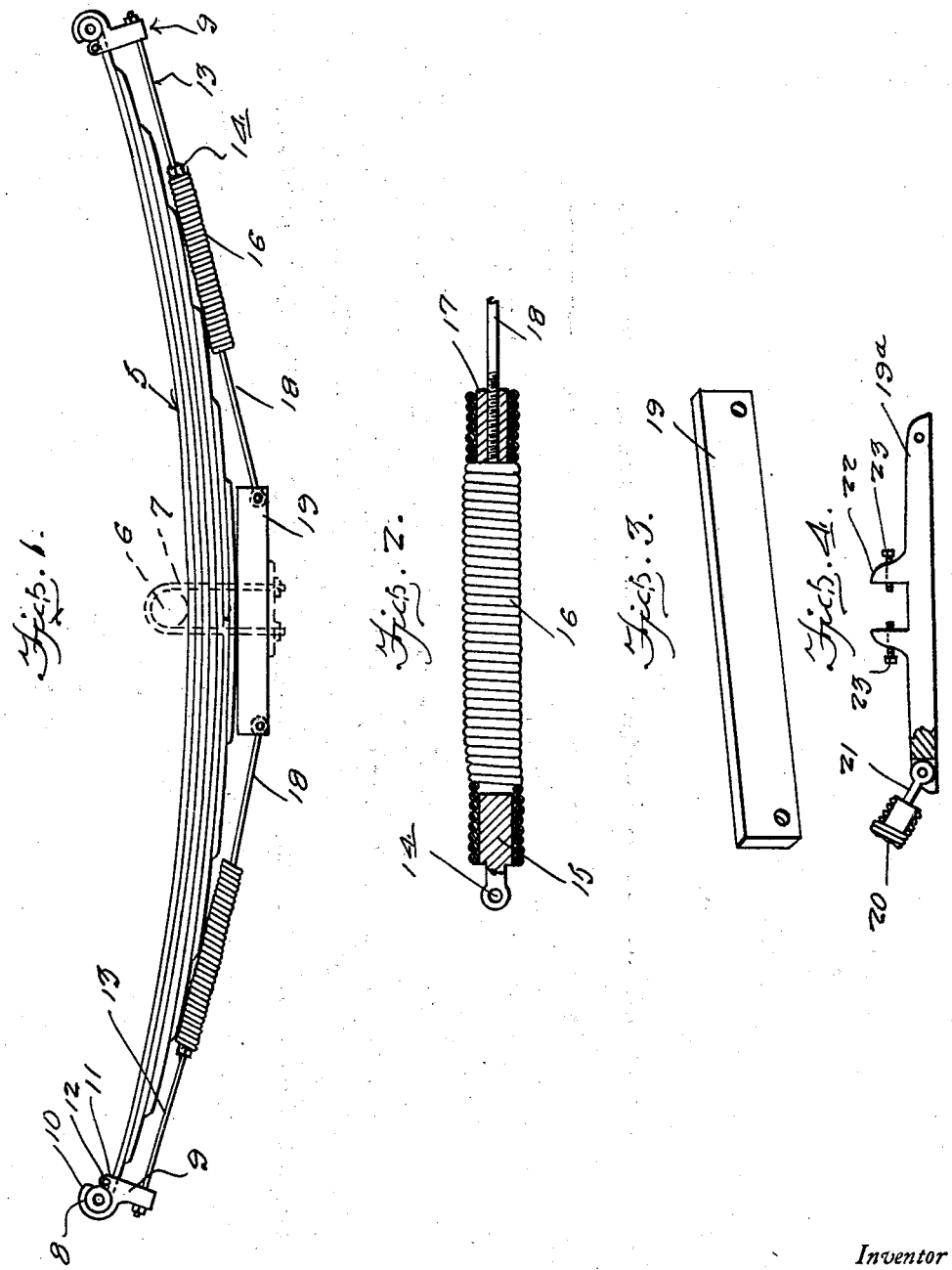
Inventor
P. P. Cunningham
By Clarence A. O'Brien
Attorney Patented Feb. 10, 1931

1,791,661

UNITED STATES PATENT OFFICE

PATRICK P. CUNNINGHAM, OF PROVO, UTAH

SHOCK ABSORBER

Application filed August 6, 1928, Serial No. 297,668. Renewed December 1, 1930.

This invention relates to the broad class of shock absorbers of the type used upon automobiles and in association with suspension springs.

The invention has more particular reference to an auxiliary appliance which is directly associated with a semi-elliptical leaf spring and the purpose of the invention is to cooperate with said leaf spring to render it more steady in action and to overcome the well known rebound to which it is frequently subjected.

My principal aim and object is to provide a structure of this character which is efficient in performance, dependable and positive in action and capable of fulfilling the requirements of an invention of this class in a successful and desirable manner.

In the drawings:

Figure 1 is an elevational view of the semi-elliptical front vehicle spring equipped with a shock absorber constructed in accordance with the present invention, Figure 2 is a detail view of one of the coiled springs constituting an important factor of the shock absorber, Figure 3 is a perspective view of a connecting block, Figure 4 is a view in section and elevation of a different type of connecting block.

Referring now to the drawings by reference numerals it will be observed that the reference character 5 designates generally an ordinary semi-elliptical rear spring fastened to the rear axle 6 by way of U-bolts 7.

As is usual the upper leaf of the spring terminates in curls or eyes 8. Associated with each curl is a bracket 9 in the form of a metal casting constructed as a hook 10 to embrace the curl and provide upstanding ears 11 depending on opposite sides of the leaf spring and carrying a retaining cross bolt 12.

This casting is made to accommodate a bolt 13 fastened to an eye equipped shank 14 carried by a cylindrical block like core 15 which is in turn fitted into one end of a coiled spring 16.

There is a spindle or brushing 17 fitted into the opposite end of the spring and is generally screw threaded to accommodate a bolt 18 which is connected with an elongated block like member 19 exending between the U-bolts 7 and the contacts at the under side of the spring 5.

The structure embodies a pair of the brackets 9 and connecting bolts. When the device is in place it occupies the position on the spring shown in Figure 1.

For the eye beam type of axle usually employed at the front I provide a connecting block of the type represented at 19a in Figure 4. This is in the form of an elongated body wherein the spring 20 is fastened thereto by a short connection spoke 21.

The block is provided with upstanding lugs 22 carrying retaining bolts 23. It is obvious that a shock absorber of this type cooperates intimately with the main frame in permitting it to function properly while yet preventing undesirable and violent rebound with which it is frequently subjected.

The simplicity of the invention is such however, as to make it unnecessary to render a more detailed description.

Minor changes in the shape, size and rearrangement coming within the field of invention claimed may be resorted to if desired.

Having thus described my invention, what I claim as new is:

1. A shock absorber comprising in combination, a leaf spring having eyes on its opposite ends, coil spring positioned against the under side of said spring and spaced from the opposite ends thereof, bolts connecting the inner ends of said spring, a connecting block coupling said bolts together, brackets mounted on the opposite ends of the spring and comprising body portions terminating at their upper ends in hook portions for embracing the spring eyes, said body portions being further provided with upstanding perforated ears positioned inwardly of the hooks and adapted to embrace the spring therebetween, bolts mounted in said ears and extending transversely across the spring in superposed relation thereto for securing the brackets thereon, and anchoring bolts connecting the outer ends of the coil spring with the brackets.

2. A shock absorber comprising in combination, a leaf spring having eyes on its opposite ends, coil springs positioned against the under side of said spring and spaced from the opposite ends thereof, bolts connected to the inner end of said spring, a connecting block slidably engaged against the underside of the spring and constituting means for coupling the bolts together, brackets mounted on the opposite ends of the spring and comprising body portions terminating at their upper ends in hooks for embracing the spring eyes, said body portion being further provided, inwardly of the hook portion, with upstanding perforated ears adapted to embrace the leaf spring therebetween, bolts mounted in said ears and extending transversely across the spring in superposed relation thereto for securing the brackets thereon, and anchoring bolts connecting the outer ends of the coil springs with the brackets.

In testimony whereof I affix my signature.

PATRICK P. CUNNINGHAM.